(12) United States Patent
Sato

(10) Patent No.: US 10,394,501 B2
(45) Date of Patent: Aug. 27, 2019

(54) IMAGE PROCESSING APPARATUS INCLUDING AN EXECUTION AUTHORITY SETTING HAVING A PERMITTED AND NOT A PERMITTED SETTING

(71) Applicant: Oki Data Corporation, Tokyo (JP)

(72) Inventor: Kimitoshi Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/383,238

(22) Filed: Dec. 19, 2016

(65) Prior Publication Data
US 2017/0212715 A1  Jul. 27, 2017

(30) Foreign Application Priority Data

Jan. 27, 2016 (JP) .................................. 2016-12973

(51) Int. Cl.
*G06F 21/60* (2013.01)
*G06F 3/12* (2006.01)
(Continued)

(52) U.S. Cl.
CPC .......... *G06F 3/1238* (2013.01); *G06F 3/1222* (2013.01); *G06F 3/1257* (2013.01); *G06F 3/1271* (2013.01); *G06F 3/1275* (2013.01); *G06F 3/1279* (2013.01); *G06F 21/31* (2013.01); *G06F 21/608* (2013.01); *H04N 1/4433* (2013.01); *G06F 3/1204* (2013.01); *G06F 3/1219* (2013.01); *G06F 3/1239* (2013.01);
(Continued)

(58) Field of Classification Search
None
See application file for complete search history.

(56) References Cited

U.S. PATENT DOCUMENTS

| 2006/0092453 A1* | 5/2006 | Okada | H04N 1/00411 358/1.14 |
| 2008/0088867 A1* | 4/2008 | Ikeda | H04N 1/00222 358/1.13 |

(Continued)

FOREIGN PATENT DOCUMENTS

| JP | 2006-167958 A | 6/2006 |
| JP | 2008052503 A | 3/2008 |

(Continued)

*Primary Examiner* — Benny Q Tieu
*Assistant Examiner* — Haris Sabah
(74) *Attorney, Agent, or Firm* — Panitch Schwarze Belissario & Nadel LLP

(57) ABSTRACT

An image processing apparatus includes an executing circuitry, a macro executing circuitry, and a managing circuitry. The executing circuitry executes one or more types of image processing. The macro executing circuitry executes, with the executing circuitry, a first macro to which predetermined one or more types of image processing out of the one or more types of image processing are assigned. The predetermined one or more types of image processing includes a first type of image processing. The managing circuitry manages execution authority setting of the first type of image processing and execution authority setting of the first macro, and temporarily changes the execution authority setting of the first type of image processing on a basis of the execution authority setting of the first macro upon the execution of the first macro by the macro executing circuitry.

9 Claims, 7 Drawing Sheets

(51) Int. Cl.
*G06F 21/31* (2013.01)
*H04N 1/44* (2006.01)
(52) U.S. Cl.
CPC .... *G06F 3/1255* (2013.01); *H04N 2201/0094* (2013.01)

(56) References Cited

U.S. PATENT DOCUMENTS

2010/0238495 A1* 9/2010 Sugimoto ............. G06F 21/608
 358/1.15
2014/0198344 A1* 7/2014 Hirata ................ H04N 1/00411
 358/1.15

FOREIGN PATENT DOCUMENTS

| | | | |
|---|---|---|---|
| JP | 2009087319 A | 4/2009 |
| JP | 2012195947 A | 10/2012 |

* cited by examiner

| USER NAME UN | PASSWORD PW | USER IDENTIFIER ID |
|---|---|---|
| USER NAME UN1 | PASSWORD PW1 | USER IDENTIFIER ID1 |
| USER NAME UN2 | PASSWORD PW2 | USER IDENTIFIER ID2 |
| USER NAME UN3 | PASSWORD PW3 | USER IDENTIFIER ID3 |
| ⋮ | ⋮ | ⋮ |

| USER IDENTIFIER ID | ACCESS CONTROL INFORMATION INF | | | | | |
|---|---|---|---|---|---|---|
| | COPY PROCESSING | FAX PROCESSING | PRINTING PROCESSING | SCAN-TO-EMAIL PROCESSING | JOB MACRO REGISTRATION PROCESSING | JOB MACRO JM1 EXECUTION PROCESSING | JOB MACRO JM2 EXECUTION PROCESSING |
| USER IDENTIFIER ID1 | PERMITTED | PERMITTED | PERMITTED | PERMITTED | PERMITTED | PERMITTED | PERMITTED |
| USER IDENTIFIER ID2 | PERMITTED | PERMITTED | PERMITTED | PERMITTED | NOT PERMITTED | PERMITTED | PERMITTED |
| USER IDENTIFIER ID3 | NOT PERMITTED | NOT PERMITTED | NOT PERMITTED | NOT PERMITTED | NOT PERMITTED | NOT PERMITTED | PERMITTED |
| ........ | ........ | ........ | ........ | ........ | ........ | ........ | ........ |

INF1, INF2, INF3 indicate the three data rows.

| JOB MACRO JM | PROCESSING | PARAMETER PM1 | | PARAMETER PM2 | | PARAMETER PM3 | |
|---|---|---|---|---|---|---|---|
| | | PARAMETER NAME / PARAMETER VALUE | FIXING FLAG F | PARAMETER NAME / PARAMETER VALUE | FIXING FLAG F | PARAMETER NAME / PARAMETER VALUE | FIXING FLAG F |
| JOB MACRO JM1 | COPY PROCESSING | COLOR/MONOCHROME / MONOCHROME | YES | SCALE / 100% | NO | NUMBER OF COPIES / 1 | NO |
| JOB MACRO JM1 | COPY PROCESSING | COLOR/MONOCHROME / MONOCHROME | YES | SCALE / 100% | NO | NUMBER OF COPIES / 1 | NO |
| JOB MACRO JM2 | SCAN-TO-EMAIL PROCESSING | E-MAIL ADDRESS / **** | YES | RESOLUTION / 200dpi | NO | | |

| | | | | | | | |
|---|---|---|---|---|---|---|---|
| SESSION NUMBER NS | | | | | | | |
| | COPY PROCE- SSING | FAX PROCE- SSING | PRINT- ING PROCE- SSING | SCAN-TO- EMAIL PROCE- SSING | JOB MACRO REGIST- RATION PROCE- SSING | JOB MACRO JM1 EXECUTION PROCESSING | JOB MACRO JM2 EXECUTION PROCESSING |
| INF3 | NOT PERMI- TTED | NOT PERMI- TTED | NOT PERMI- TTED | NOT PERMITTED | NOT PERMITTED | NOT PERMITTED | PERMITTED |

FIG. 6B

SESSION NUMBER NS

INF3

| COPY PROCE- SSING | FAX PROCE- SSING | PRINT- ING PROCE- SSING | SCAN-TO- EMAIL PROCE- SSING | JOB MACRO REGIST- RATION PROCE- SSING | JOB MACRO JM1 EXECUTION PROCESSING | JOB MACRO JM2 EXECUTION PROCESSING |
|---|---|---|---|---|---|---|
| (PERMI- TTED) | NOT PERMI- TTED | NOT PERMI- TTED | (PERMITTED) | NOT PERMITTED | NOT PERMITTED | (PERMITTED) |

INForg

| COPY PROCE- SSING | FAX PROCE- SSING | PRINT- ING PROCE- SSING | SCAN-TO- EMAIL PROCE- SSING | JOB MACRO REGIST- RATION PROCE- SSING | JOB MACRO JM1 EXECUTION PROCESSING | JOB MACRO JM2 EXECUTION PROCESSING |
|---|---|---|---|---|---|---|
| NOT PERMI- TTED | NOT PERMI- TTED | NOT PERMI- TTED | NOT PERMITTED | NOT PERMITTED | NOT PERMITTED | PERMITTED |

IMAGE PROCESSING APPARATUS INCLUDING AN EXECUTION AUTHORITY SETTING HAVING A PERMITTED AND NOT A PERMITTED SETTING

CROSS REFERENCE TO RELATED APPLICATIONS

This application claims the benefit of Japanese Priority Patent Application JP 2016-012973 filed on Jan. 27, 2016, the entire contents of which are incorporated herein by reference.

BACKGROUND

The invention relates to an image processing apparatus that executes image processing.

Some image processing apparatuses allow for setting of authority to perform each processing for each user. For example, Japanese Unexamined Patent Application Publication No. 2006-167958 discloses a printing system that performs security setting using a user authentication unit and a security level list, referring to.

SUMMARY

It is desired that high security be achieved in an image processing apparatus. However, an improvement m security may lead to deterioration in user-friendliness.

It is desirable to provide an image processing apparatus that achieves both an improvement in user-friendliness and an improvement in security.

An image processing apparatus according to one embodiment of the invention includes an executing circuitry, a macro executing circuitry, and a managing circuitry. The executing circuitry executes one or more types of image processing. The macro executing circuitry executes, with the executing circuitry, a first macro to which predetermined one or more types of image processing out of the one or more types of image processing are assigned, the predetermined one or more types of image processing including a first type of image processing. The managing circuitry manages execution authority setting of the first type of image processing and execution authority setting of the first macro, and temporarily changes the execution authority setting of the first type of image processing on a basis of the execution authority setting of the first macro upon the execution of the first macro by the macro executing circuitry.

An image processing apparatus according to one embodiment of the invention, includes an executing circuitry, a macro executing circuitry, and a macro registering circuitry. The executing circuitry executes one or more types of image processing. The macro executing circuitry executes, with the executing circuitry, a first macro to which predetermined one or more types of image processing out of the one or more types of image processing are assigned. The predetermined one or more types of image processing includes a first type of image processing. The first type of image processing is provided with a settable parameter. The macro registering circuitry registers the first macro and is able to set, upon registering the first macro, whether the parameter value of the parameter is changeable or unchangeable upon the execution of the first macro by the macro executing circuitry.

BRIEF DESCRIPTION OF THE DRAWINGS

FIG. 2 is a diagram for describing a configuration example of data stored in an authentication database illustrated in FIG. 1.

FIG. 3 is a diagram for describing a configuration example of data stored in a user information database illustrated in FIG. 1.

FIG. 4 is a diagram for describing a configuration example of data stored in a job macro database illustrated in FIG. 1.

FIG. 6A is a diagram for describing an operation example of a session managing circuitry illustrated in FIG. 1.

FIG. 6B is a diagram for describing the operation example of the session managing circuitry illustrated in FIG. 1.

DETAILED DESCRIPTION

Some example embodiments of ale invention are described below in detailed with reference to the drawings.
[Configuration Example]

Figure 1:
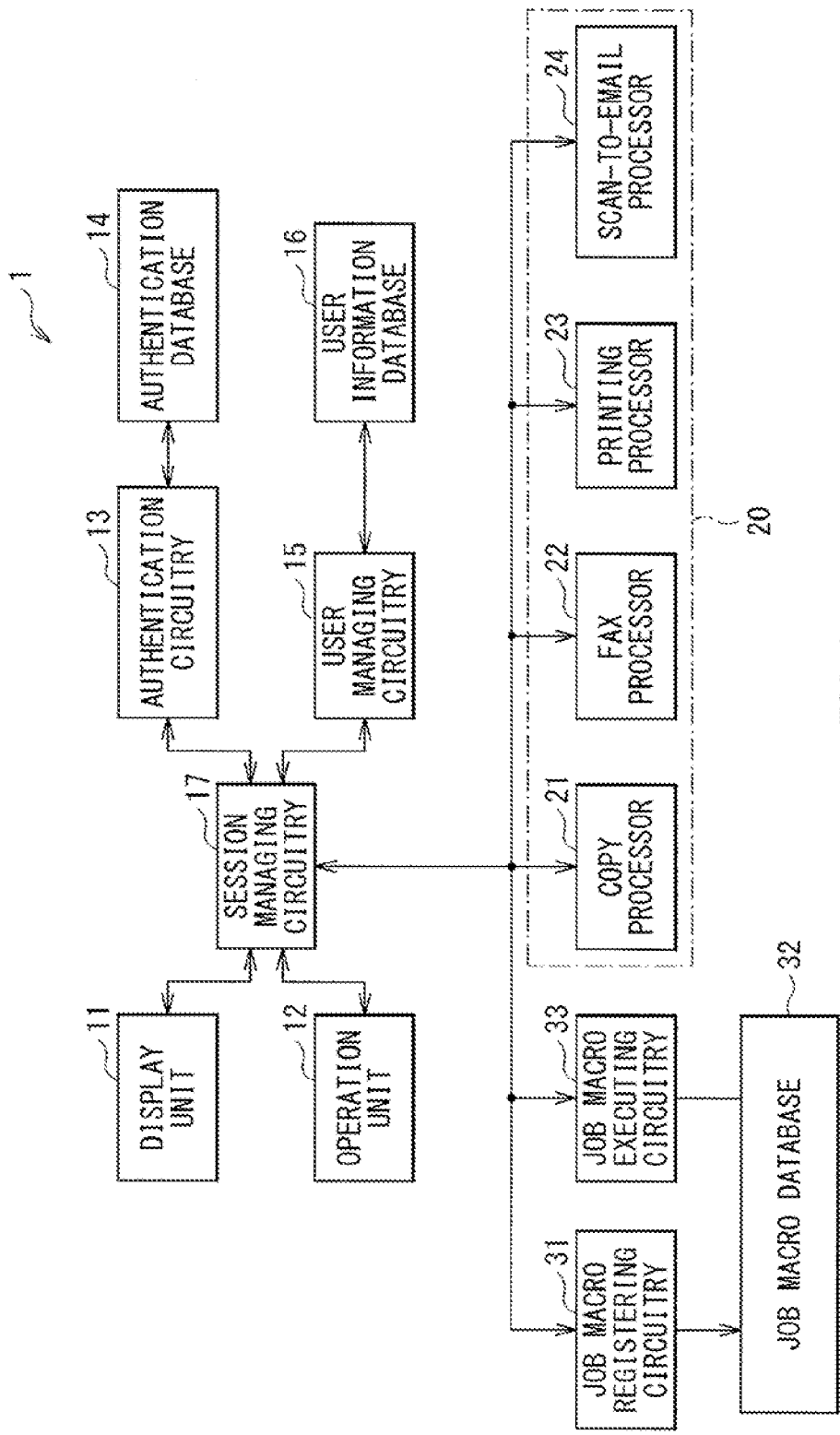
FIG. 1 is a block diagram illustrating a configuration example of an image forming apparatus according to one example embodiment of the invention.

FIG. 1 illustrates a configuration example of an image processing apparatus (an image forming apparatus 1) according to one example embodiment of the invention. The image forming apparatus 1 may be a so-called multi-function peripheral (MFP) that has functions such as copying, faxing, and scanning.

The image forming apparatus 1 may include a display unit 11, an operation unit 12, an authentication circuitry 13, an authentication database 14, a user managing circuitry 15, a user information database 16, a session managing circuitry 17, an executing circuitry 20, a job macro registering circuitry 31, a job macro database 32, and a job macro executing circuitry 33.

The display unit 11 may include components such as a liquid crystal display, for example. The display unit 11 may display thereon an operation screen of the image forming apparatus 1, a state of the image forming apparatus 1, etc., for example. The operation unit 12 may include components such as a touch panel and various buttons. The operation unit 12 may perform reception of instructions given by a user. The user may use the operation unit 12 to input a user name UN and a password PW upon using the image forming apparatus 1. Further, the user may use the operation unit 12 to give the image forming apparatus 1 instructions to perform processing such as copy processing.

The authentication circuitry 13 may perform user authentication processing using the authentication database 14 on a basis of the inputted user name UN and the inputted password PW. The authentication database 14 may be a database that is used by the authentication circuitry 13 upon performing the user authentication processing.

FIG. 2 illustrates a configuration example of data stored in the authentication database 14. The authentication database 14 may so store the user name UN, the password PW and a user identifier ID that the user name UN, the password PW, and the user identifier ID are associated with each other. More specifically, in the present example, the authentication database 14 may so store a user name UN1, a password PW1, and a user identifier ID1 that the user name UN1, the password PW1, and the user identifier ID1 are associated with each other. The authentication database 14 may also so store a user name UN2, a password PW2, and a user identifier ID2 that the user name UN2, the password PW2, and the user identifier ID2 are associated with each other.

The authentication database 14 may also so store a user name UN3, a password PW3, and a user identifier ID3 that the user name UN3, the password PW3, and the user identifier ID3 are associated with each other.

The authentication circuitry 13 may perform the user authentication processing using the foregoing authentication database 14, on the basis of the inputted user name UN and the inputted password PW. Further, when user authentication is successful, the authentication circuitry 13 may acquire the user identifier ID associated with the inputted user name UN and the inputted password PW from the authentication database 14. Further, the authentication circuitry 13 may supply the acquired user identifier ID to the user managing circuitry 15.

The user managing circuitry 15 may acquire access control information INF using the user information database 16, on the basis of the user identifier ID. The user information database 16 may be a database that stores various pieces of user information about each user including the access control information INF.

FIG. 3 illustrates a configuration example of data stored in the user information database 16. The user information database 16 may so store the user identifier ID and the user information (the access control information INF, in the present example) that the user identifier ID and the user information are associated with each other. More specifically, in the present example, the user information database 16 may so store the user identifier ID1 and access control information INF1 that the user identifier ID1 and the access control information INF1 are associated with each other. The user information database 16 may also so store the user identifier ID2 and access control information INF2 that the user identifier ID2 and the access control information INF2 are associated with each other. The user information database 16 may also so store the user identifier ID3 and access control information INF3 that the user identifier ID3 and the access control information INF3 are associated with each other.

The access control information INF may be information about authority to perform copy processing, fax processing, printing processing, scan-to-email processing, job macro registration processing, job macro JM1 execution processing, and job macro JM2 execution processing. The copy processing refers to processing performed by a copy processor 21 which will be described later. The fax processing refers to processing performed by a fax processor 22 which will be described later. The printing processing refers to processing performed by a printing processor 23 which will be described later. The scan-to-email processing refers to processing performed by a scan-to-email processor 24 which will be described later. The job macro registration processing refers to registration processing performed by a job macro registering circuitry 31 which will be described later. Two job macros JM1 and JM2 may be registered in the present example. The job macro JM1 execution processing refers to execution processing of the job macro JM1 performed by the job macro executing circuitry 33. The job macro JM2 execution processing refers to execution processing of the job macro JM2 performed by the job macro executing circuitry 33. It is to be noted that, although the present example involves registration of the two job macros JM1 and JM2, the number of registered job macros JM is not limited to two. Alternatively, one job macro JM may be registered, or three or more job macros JM may be registered.

In the present example, the authority setting of all types of processing including the copy processing, the fax processing, the printing processing, the scan-to-email processing, the job macro registration processing, the job macro JM1 execution processing, and the job macro JM2 execution processing are set to "permitted" for the user identifier ID1. In other words, the user identifier ID1 has authority to perform all of the types of processing. Such an authority setting may be used for a user who administers the image forming apparatus 1, for example.

Moreover, the authority settings other than the authority setting of the job macro registration processing are set to "permitted", and the authority setting of the job macro registration procession is set to "not permitted" for the user identifier ID2 in the present example. In other words, the user identifier ID2 has authority to perform all of the types of processing except for the job macro registration processing. Such an authority setting may be used for a general user who uses the image forming apparatus 1, for example.

Moreover, the authority setting of the job macro JM2 execution processing is set to "permitted" and the authority settings other than the authority setting of the job macro JM2 execution processing are set to "not permitted" for the user identifier ID3 in the present example. In other words, the user identifier ID3 has authority to perform only the job macro JM2 execution processing. Such an authority setting may be used for a limited user who is limited in one's use of the image forming apparatus 1, for example.

The user managing circuitry 15 may acquire the access control information INF using the foregoing user information database 16, on the basis of the user identifier ID. Further, the user managing circuitry 15 may supply the acquired access control information INF to the session managing circuitry 17.

The session managing circuitry 17 may manage a session S. More specifically, first, the session managing circuitry 17 may issue a session S each time the user inputs the user name UN and the password PW using the operation unit 12 to log in to the image forming apparatus 1. Upon issuing the session S, the session managing circuitry 17 may set a session number NS for the issued session S. The session number NS is provided for identifying the session S. This allows for managing sessions for the respective users, for example, even when a plurality of sessions S are performed by a plurality of users at the same time. Further, the session managing circuitry 17 may set the access control information INF supplied from the user managing circuitry 15 to the session S. Further, upon receiving an inquiry about authority from the executing circuitry 20, the job macro registering circuitry 31, and the job macro executing circuitry 33, the session managing circuitry 17 may make a reply with an answer about a authority state ("permitted" or "not permitted") on the basis of the access control information INF set to the session S. Further, when the job macro executing circuitry 33 executes the job macro JM, the session managing circuitry 17 may temporarily replace the authority setting, included in the access control information INF set to the session S, of each of the types of processing included in the job macro JM to be executed, with the authority setting of the job macro JM execution processing.

The executing circuitry 20 may execute image processing on the basis of instructions given by the user. Further, the executing circuitry 20 may also execute image processing on the basis of instructions given by the job macro executing circuitry 33. The executing circuitry 20 may include the copy processor 21, the fax processor 22, the printing processor 23, and the scan-to-email processor 24.

The copy processor 21 may perform the copy processing. More specifically, upon performing the copy processing on the basis of the instructions given by the user, the copy processor 21 may first inquire of the session managing circuitry 17 whether the user has the authority to perform the copy processing, on the basis of the instructions given by the user to execute the copy processing. Further, when the user has the authority to perform the copy processing, the copy processor 21 may execute the copy processing using a parameter PM included in the instructions given by the user. More specifically, the copy processor 21 may scan a document, and print a result of the scanning. Examples of the parameter PM provided for the copy processing may include, the number of copies, a scale, a color-monochrome setting (a setting of selection between color and monochrome), and a paper site.

Alternatively, upon performing the copy processing on the basis of the it given by the job macro executing circuitry 33, the copy processor 21 may first inquire of the session managing circuitry 17 whether the user has the authority to perform the copy processing, on the basis of the instructions given by the job macro executing circuitry 33 to execute the copy processing. Further, when the user has the authority to perform the copy processing, the copy processor 21 may execute the copy processing using the parameter PM included in the instructions given by the user or the job macro executing circuitry 33.

The fax processor 22 may perform the fax processing. More specifically, upon performing fax sending processing on the basis of the instructions given by the user, the fax processor 22 may first inquire of the session managing circuitry 17 whether the user has the authority to perform the fax processing, on the basis of the instructions given by the user to execute the fax sending processing. Further, when the user has the authority to perform the fax processing, the fax processor 22 may execute the fax sending processing using a parameter PM included in the instructions given by the user. Examples of the parameter PM provided for the fax processing may include the fax number of a receiver and resolution.

Alternatively, upon performing the fax sending processing on the basis of the instructions given by the job macro executing circuitry 33, the fax processor 22 may first inquire of the session managing circuitry 17 whether the user has authority to perform the fax processing, on the basis of the instructions given by the job macro executing circuitry 33 to execute the fax sending processing. Further, when the user has the authority to perform the fax processing, the fax processor 22 may execute the fax sending processing using the parameter PM included in the instructions given by the user or the job macro executing circuitry 33. Further, the fax processor 22 may execute fax receiving processing without inquiring whether the user has the authority to perform the fax processing when a fax is sent to the image forming apparatus 1.

The printing processor 23 may perform the printing processing. More specifically, upon performing the printing processing on the basis of the instructions given by the user, the printing processor 23 may first inquire of the session managing circuitry 17 whether the user has the authority to perform the printing processing, on the basis of the instructions given by the user to execute the printing processing. Further, when the user has the authority to perform the printing processing, the printing processor 23 may execute the printing processing using a parameter PM included in the instructions given by the user. Examples of the parameter PM provided for the printing processing may include the number of copies, the color-monochrome setting, and the paper size.

Alternatively, upon performing the printing processing on the basis of the instructions given by the job macro executing circuitry 33, the printing processor 23 may first inquire of the session managing circuitry 17 whether the user has the authority to perform the printing processing, on the basis of the instructions given by the job macro executing circuitry 33 to execute the printing processing. Further, when the user has the authority to perform the printing processing, the printing processor 23 may execute the printing processing using a parameter PM included in the instructions given by the user or the job macro executing circuitry 33.

The scan-to-email processor 24 may perform the scan-to-email processing. More specifically, upon performing the scan-to-email processing on the basis of the instructions given by the user, the scan-to-email processor 24 may first inquire of the session managing circuitry 17 whether the user has the authority to perform the scan-to-email processing, on the basis of the instructions given by the user to execute the scan-to-email processing. Further, when the user has the authority to perform the scan-to-email processing, the scan-to-email processor 24 may execute the scan-to-email processing using a parameter PM included in the instructions given by the user. More specifically, the scan-to-email processor 24 may scan the document, and send a result of the scanning by e-mail. Examples of the parameter PM provided for the scan-to-email processing may include an email address of a receiver, resolution, a compression rate, and a color-monochrome setting.

Alternatively, upon performing the scan-to-email processing on the basis of the instructions given, by the job macro executing circuitry 33, the scan-to-email processor 24 may first inquire of the session managing circuitry 17 whether the user has the authority to perform the scan-to-email processing, on the basis of the instructions given by the job macro executing circuitry 33 to execute the scan-to-email processing. Further, when the user has the authority to perform the scan-to-email processing, the scan-to-email processor 24 may execute the scan-to-email processing using a parameter PM included in the instructions given by the user or the job macro executing circuitry 33.

The job macro registering circuitry 31 may register the job macro JM with the job macro database 32 on the basis of the instructions given by the user. More specifically, the job macro registering circuitry 31 may first inquire of the session managing circuitry 17 whether the user has the authority to perform the job macro registration processing, on the basis of the instructions given by the user to execute the job macro registration processing. Further, when the user has the authority to perform the job macro registration processing, the job macro registering circuitry 31 may register, with the job macro database 32, one or more types of processing out of the copy processing, the fax processing, the printing processing, and the scan-to-email processing together the parameter PM as the job macro JM, on the basis of the instructions given by the user. Upon registering the job macro JM, the job macro registering circuitry 31 may be able to set whether the parameter value is changeable upon execution of the job macro JM, for each of the parameters PM, on the basis of the instructions given by the user. The on macro registering circuitry 31 may use a fixing flag F which will be described later, upon setting whether the parameter value is changeable.

The job macro database 32 may store the job macro JM.

FIG. 4 illustrates a configuration example of the data stored in the job macro database 32. Two job macros JM1 and JM2 are registered with the job macro database 32 in the present example.

The job macro JM1 is set to invoke the copy processing provided with three parameters PM1 to PM3. The parameter PM1 is the color-monochrome setting, and is set to "monochrome" in the present example. The fixing flag F of this parameter PM1 is set to "YES". This makes the setting of the parameter PM1 unchangeable upon execution of the job macro JM1. The parameter PM2 is the scale, and is set to "100%" in the present example. The fixing flag F of this parameter PM2 is set to "NO". This makes the setting of the parameter PM2 changeable upon execution of the job macro JM1. The parameter PM3 is the number of copies, and is set to "1" in the present example. The fixing flag F of this parameter PM3 is set to "NO". This makes the setting of the parameter PM3 changeable upon execution of the job macro JM1.

The job macro JM2 is set to involve the copy processing provided with three parameters PM1 PM3 and the scan-to-email processing provided with two parameters PM1 and PM2. The parameters PM1 to PM3 provided for the copy processing are the same as the parameters PM1 to PM3 provided for the copy processing involved in the job macro JM1 in the present example. However, this is not limitative. Alternatively, one or more of the three parameters PM1 to PM3 may differ between the copy processing involved in the job macro JM1 and the copy processing involved in the job macro JM2, for example. The parameter PM1 provided for the scan-to-email processing is the e-mail address of the receiver, and is set to a particular e-mail address. The fixing flag F of this parameter PM1 is set to "YES". This makes the setting of the parameter PM1 unchangeable upon execution of the job macro JM2. The parameter PM2 provided for the scan-to-email processing is the resolution, and is set to "200 dpi" in the present example. The fixing flag F of this parameter PM2 is set to "NO". This makes the setting of the parameter PM2 changeable upon execution of the job macro JM2.

The job macro executing circuitry 33 may execute the job macro JM registered with the job macro database 32, on the basis of the instructions given by the user. More specifically, the job macro executing circuitry 33 may first inquire of the session managing circuitry 17 whether the user has the authority to execute the job macro JM, on the basis of the instructions given by the user to execute the job macro JM. Further, when the user has the authority to execute the job macro JM, the job macro executing circuitry 33 may execute the job macro JM to cause the executing circuitry 20 to perform each of the types of processing included in the job macro JM.

More specifically, for example, upon receiving instructions given by the user to execute the job macro JM1, the job macro executing circuitry 33 may inquire of the session managing circuitry 17 whether the user has the authority to execute the job macro JM1. Further, when the user has the authority to execute the job macro JM1, the job macro executing circuitry 33 may cause the copy processor 21 to execute the copy processing. The copy processing is provided with the color-monochrome setting (the parameter PM1) that is set to "monochrome", the scale the parameter PM2) that is set to "100%", and the number of copies the parameter PM3) that is set to "1". Out of the foregoing settings, the user is not allowed to change the color-monochrome setting (the parameter PM1), but is allowed to change the scale (the parameter PM2) and the number of copies (the parameter PM3).

Moreover, for example, upon receiving instructions given by the use to execute the job macro JM2, the job macro executing circuitry 33 may inquire of the session managing circuitry 17 whether the user has the authority to execute the job macro JM2. Further, when the user has the authority to execute the job macro JM2, the job macro executing circuitry 33 may first cause the copy processor 21 to execute the copy processing, and thereafter cause the scan-to-email processor 24 to execute the scan-to-email processing. The copy processing is provided with the color-monochrome setting (the parameter PM1) that is set to "monochrome", the scale (the parameter PM2) that is set to "100%", and the number of copies (the parameter PM3) that is set to "1". Out of the foregoing settings, the user is not allowed to change the color-monochrome setting (the parameter PM1), but is allowed to change the scale (the parameter PM2) and the number of copies (the parameter PM3). Further, the scan-to-email processing is provided with the e-mail address (the parameter PM1) that is set to a particular e-mail address, and the resolution (the parameter PM2) that is set to "200 dpi". Out of the foregoing settings, the user is not allowed to change the e-mail address the parameter PM1), but is allowed to change the resolution (the parameter PM2).

The image forming apparatus 1 may correspond to a "image processing apparatus" in one specific but non-limiting embodiment of the invention. The job macro executing circuitry 33 may correspond to a "macro executing circuitry" in one specific but non-limiting embodiment of the invention. The session managing circuitry 17 may correspond to a "managing circuitry" in one specific but non-limiting embodiment of the invention. The job macro registering circuitry 31 may correspond to a "macro registering circuitry" in one specific but non-limiting embodiment of the invention.

[Operation and Workings]

Next, operation and workings of the image forming apparatus 1 according to the present example embodiment are described.

(Outline of Overall Operation)

First, an outline of overall operation of the image forming apparatus 1 is described referring to FIG. 1. Upon using the image forming apparatus 1, the user may input the user name UN and the password PW using the operation unit 12. The session managing circuitry 17 may issue the session S and set the session number NS to the session S each time the user logs in to the image forming apparatus 1. The authentication circuitry 13 may perform the user authentication processing using the authentication database 14 on the basis of the inputted user name UN and the inputted password PW to acquire the user identifier ID. The user managing circuitry 15 may acquire the access control information INF using the user information database 16 on the basis of the user identifier ID. The session managing circuitry 17 may set the acquired access control information INF to the session S.

Thereafter, the user may give the image forming apparatus 1 instructions to perform processing, using the operation unit 12. When the instructions given by the user are instructions to perform any of the copy processing, the fax processing, the printing processing, and the scan-to-email processing, the executing circuitry 20 may execute the image processing on the basis of the instructions given by the user. Alternatively, when the instructions given by the user are instructions to perform the job macro registration processing, the job macro registering circuitry 31 may register the job macro with the job macro database 32 on the basis of the instructions given by the user. Alternatively, when the instructions given by the user are instructions to execute the job macro JM, the job macro executing circuitry 33 may execute the job macro JM registered with the job macro database 32 on the basis of the instructions given by the user.

Further, the session managing circuitry 17 may terminate the session S when the user logs off of the image forming apparatus 1.

(Detailed Operation)

Figure 5A:
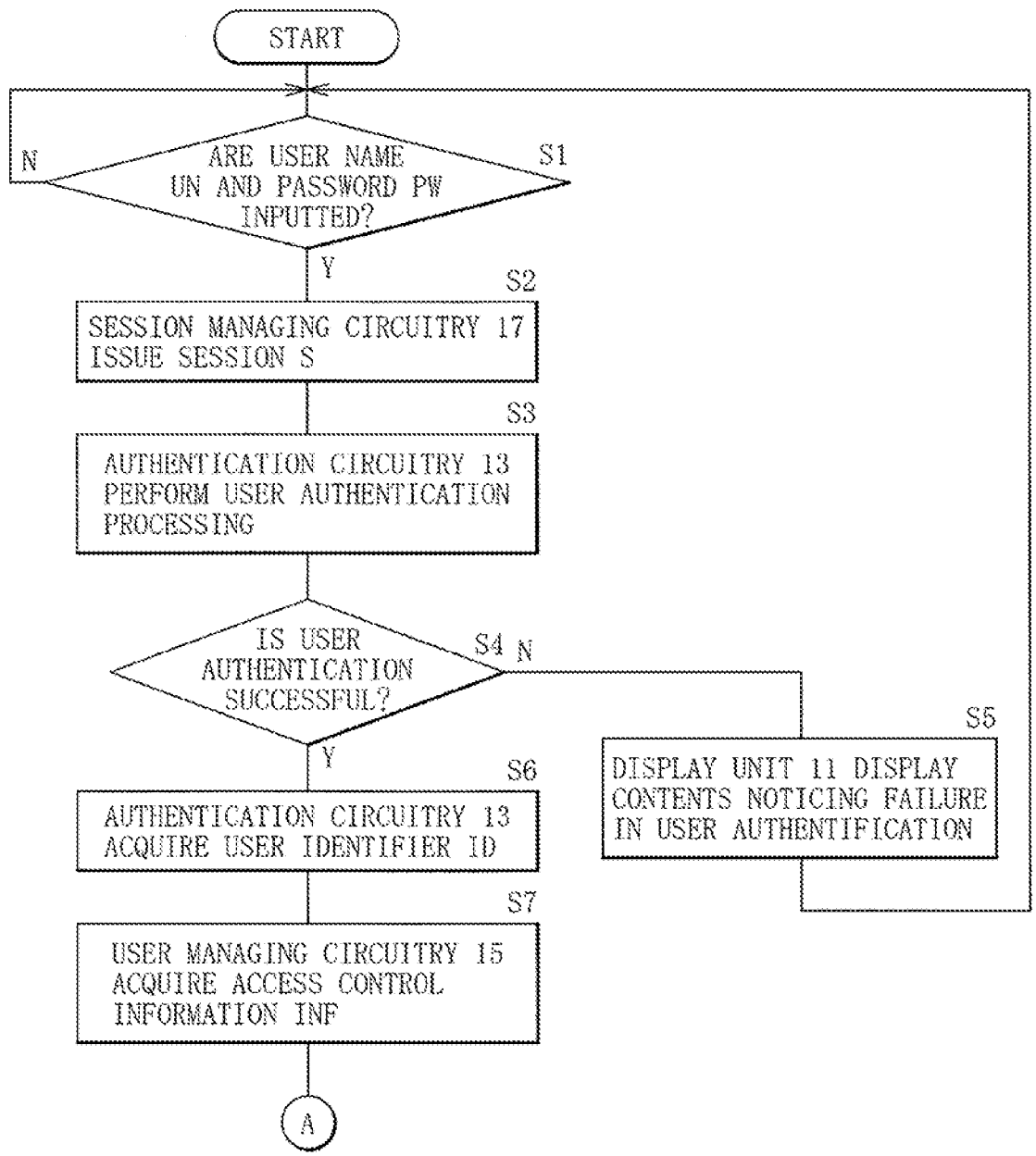
FIG. 5A is a flowchart illustrating an operation example of the image forming apparatus illustrated in FIG. 1.
Figure 5B:
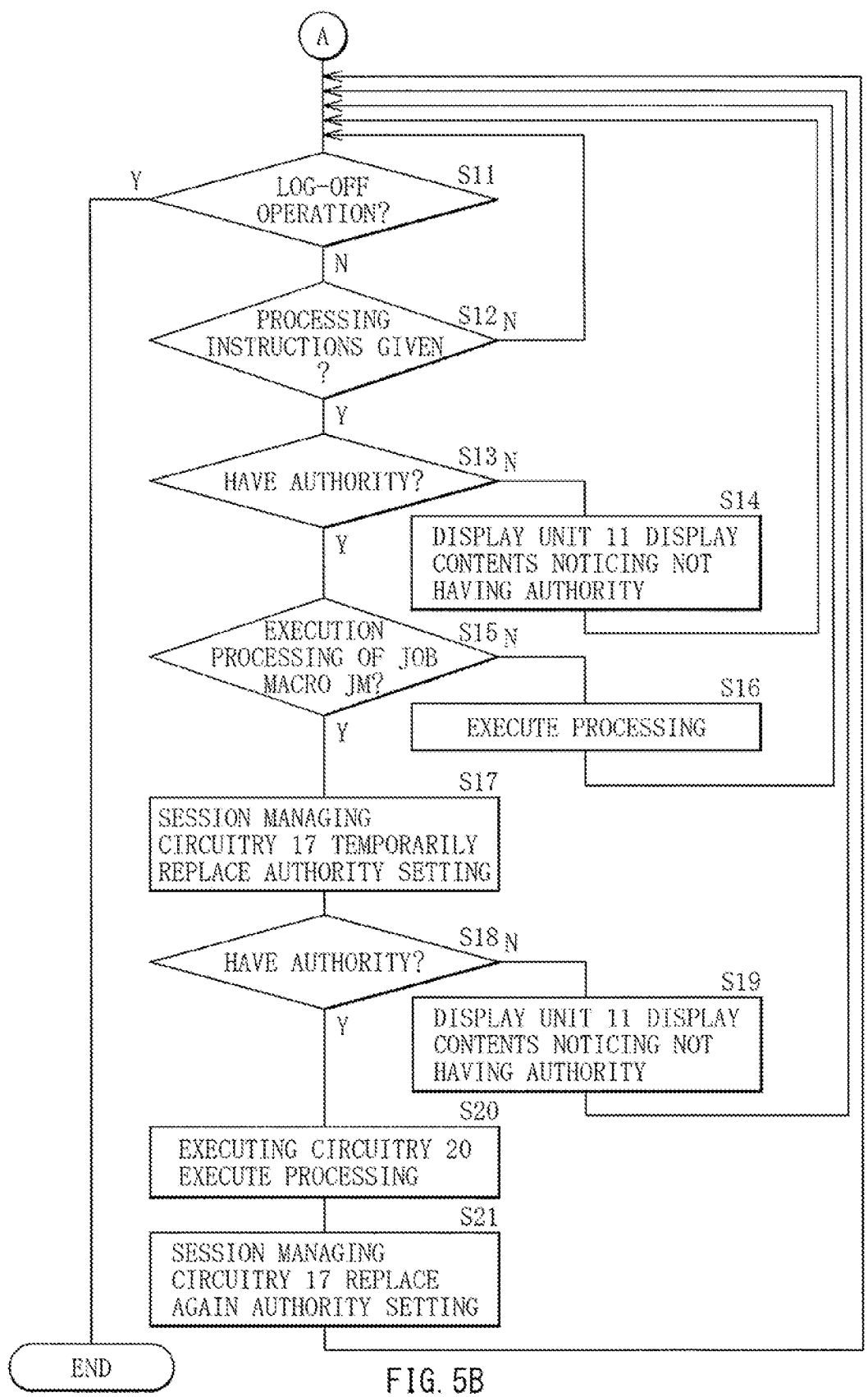
FIG. 5B is a flowchart illustrating the operation example of the image forming apparatus illustrated in FIG. 1.

FIGS. 5A and 5B illustrate an operation example of the image forming apparatus 1. When the user logs in to the image forming apparatus 1, the session S may be issued, and the access control information INF corresponding to the user may be set to the session S. Further, the executing circuitry 20, the job macro registering circuitry 31, and the job macro executing circuitry 33 may each perform corresponding processing on the basis of the instructions given by the user. This operation is described below in detail.

First, the image forming apparatus 1 confirms whether the user name UN and the password PW are inputted (step S1). When the image forming apparatus 1 confirms, that the user name UN and the password PW are not inputted ("N" in step S1), the image forming apparatus 1 repeats step S1 until the image forming apparatus 1 confirms that the user name UN and the password PW are inputted.

When the image forming apparatus 1 confirms that the user name UN and the password PW are inputted in step S1 ("Y" in step S1), the session managing circuitry 17 issues the session S (step S2). Further, the session managing circuitry 17 sets the session number NS to the session S.

Thereafter, the authentication circuitry 13 performs the user authentication (step S3). More specifically, the authentication circuitry 13 performs the user authentication processing using the authentication database 14 on the basis of the inputted user name UN and the inputted password PW. When the user authentication fails ("N" in step S4), the display unit 11 displays contents noticing the failure in the user authentication (step S5), and the process returns to step S1.

When the user authentication is successful ("Y" in step S4), the authentication circuitry 13 acquires, from the authentication database 14, the user identifier ID that is associated with the inputted user name UN and the inputted password PW (step S6).

Thereafter, the user managing circuitry 15 acquires the access control information INF using the user information database 16 on the basis of the user identifier ID that has been acquired by the authentication circuitry 13 in step S6 (step S7). Further, the session managing circuitry 17 sets the acquired access control information INF to the session S.

Thereafter, the image forming apparatus 1 confirms whether log-off operation is performed by the user (step S11). When the image forming apparatus 1 confirms that the log-off operation is performed ("Y" in step S11), the flow is brought to the end.

When the image forming apparatus 1 confirms that the log-off operation is not performed in step S11 ("N" in step S11), the image forming apparatus 1 confirms whether instructions including any of the copy processing, the fax processing, the printing processing, the scan-to-email processing, the job macro registration processing, and the execution processing of the job macro JM is given by the user (step S12). When the image forming apparatus 1 confirms that no instruction is given ("N" in step S12), the process returns to step S11.

When the image forming apparatus 1 confirms that the instructions have been given in step S12 ("Y" in step S12), the session managing circuitry 17 confirms whether the user has the authority (is "permitted" or "not permitted") to perform the processing included in the instructions that have been confirmed to be given in step S12, on the basis of the access control information INF (step S13). More specifically, when the instructions that have been confirmed to be given in step S12 are instructions to perform the copy processing, the session managing circuitry 17 confirms whether the user has the authority to perform the copy processing in response to the inquiry from the copy processor 21, and makes a reply, to the copy processor 21, with a result of the confirmation. Similarly, when the instructions that have been confirmed to be given in step S12 are instructions to perform the fax processing, the session managing circuitry 17 confirms whether the user has the authority to perform the fax processing in response to the inquiry from the fax processor 22, and makes a reply, to the fax processor 22, with a result of the confirmation. Further, when the instructions that have been confirmed to be given in step S12 are instructions to perform the printing processing the session managing circuitry 17 confirms whether the user has the authority to perform the printing processing in response to the inquiry from the printing processor 23, and makes a reply, to the printing processor 23, with a result of the confirmation. Further, when the instructions that have been confirmed to be given in step S12 are instructions to perform the scan-to-email processing, the session managing circuitry 17 confirms whether the user has the authority to perform the scan-to-email processing in response to the inquiry from the scan-to-email processor, and makes a reply, to the scan-to-email processor 24, with a result of the confirmation. Further, when the instructions that have been confirmed to be given in step S12 are instructions to perform the registration processing of the job macro JM, the session managing circuitry 17 confirms whether the user has the authority to perform the job macro registration processing in response to the inquiry from the job macro registering circuitry 31, and makes a reply, to the job macro registering circuitry 31, with a result of the confirmation. Further, the instructions that have been confirmed to be given in step S12 are instructions to perform the execution processing of the job macro JM, the session managing circuitry 17 confirms whether the user has the authority to perform the execution processing of the job macro JM in response to the inquiry from the job macro executing circuitry 33, and makes a reply, to the job macro executing circuitry 33, with a result of the confirmation.

When the session managing circuitry confirms that the user does not have the authority to perform the processing included in the instructions ("N" in step S13), the display unit 11 displays contents noticing that the user does not have the authority to perform the processing (step S14), and the process returns to step S11.

When the session managing circuitry 17 confirms that the user has the authority to perform the processing included in the instructions ("Y" in step S13) the image forming apparatus 1 executes the processing included in the instructions.

More specifically, when the processing included in the instructions is not the execution processing of the job macro JM ("N" in step S15), any of the copy processor 21, the fax processor 22, the printing processor 23, the scan-to-email processor 24, and the job macro registering circuitry 31 corresponding to the processing included in the foregoing instructions executes the processing (step S16). More specifically, when the instructions that have been confirmed to be given in step S12 are instructions to perform the copy processing, the copy processor 21 performs the copy processing using the parameter PM included in the instructions. Similarly, when the instructions that have been confirmed to be given in step S12 are instructions to perform the fax processing, the fax processor 22 performs the fax processing using the parameter PM included in the instructions. Further, when the instructions that have been confirmed to be given in step S12 are instructions to perform the printing processing, the printing processor 23 performs the printing processing using the parameter PM included in the instructions. Further, when the instructions that have been confirmed to be given in step S12 are instructions to perform the scan-to-email processing, the scan-to-email processor 24 performs the scan-to-email processing using the parameter PM included in the instructions. Further, when the instructions that have been confirmed to be given in step S12 are instructions to perform the registration processing of the job macro JM, the job macro registering circuitry 31 performs the job macro registration processing on the basis of the instructions given by the user. Thereafter, the process returns to step S11.

When the instructions that have been confirmed to be given in step S12 are instructions to perform the execution processing of the job macro JM ("Y" in step S15), the session managing circuitry 17 temporarily replace the authority setting, included in the access control information INF set to the session S, of each of the types of processing included in the job macro JM, with the authority setting of the execution processing of the job macro JM (step S17).

Thereafter, the session managing circuitry 17 confirms whether the user has the authority (is "permitted" or "not permitted") to perform the respective types of processing included in the job macro JM, on the basis of the access control information INF set to the session S (step S18).

For example, when the execution processing of the job macro JM1 illustrated in FIG. 4 is to be performed, the session managing circuitry 17 confirms whether the user has the authority to perform the copy processing in response to the inquiry from the copy processor 21, and makes a reply, to the copy processor 21, with a result of the confirmation. Alternatively, for example, when the execution processing of the job macro JM2 illustrated in FIG. 4 is to be performed, the session managing circuitry 17 confirms whether the user has the authority to perform the copy processing in response to the inquiry from the copy processor 21, and makes a reply, to the copy processor 21, with a result of the confirmation. Further, the session managing circuitry 17 also confirms whether the user has the authority to perform the scan-to-entail processing in response to the inquiry from the scan-to-email processor 24, and makes a reply, to the scan-to-email processor 24, with a result of the confirmation.

When the session managing circuitry 17 confirms that the user does not have the authority to perform the respective types of processing included in the job macro JM in step S18 ("N" in step S18), the display unit 11 displays contents noticing that the user does not have the authority to perform the respective types of processing (step S19), and the process returns to step S11.

When the session managing, circuitry 17 confirms that the user has the authority to perform the respective types of processing included in the job macro JM in step S18 ("Y" in step S18), the executing circuitry 20 performs the respective types of processing included in the job macro JM on the basis of For example, when the execution processing of the job macro JM1 illustrated in FIG. 4 is to be performed, the copy processor 21 in the executing circuitry 20 performs the copy processing using the parameters PM1 to PM3 provided for the copy processing included in the job macro JM1. Further, for example, when the execution processing of the job macro JM2 illustrated in FIG. 4 is to be performed, the copy processor 21 in the executing circuitry 20 performs the copy processing using the parameters PM1 to PM3 provided for the copy processing included in the job macro JM2, and the scan-to-email processor 24 in the executing circuitry 20 performs the scan-to-email processing using the parameters PM1 and PM2 provided for the scan-to-email processing included in the job macro JM2.

Thereafter, the session managing circuitry 17 replaces again, with the original authority setting, the authority setting that has been replaced in step S17 (step S21). Further, the process returns to step S11, and the image forming apparatus 1 is brought into a standby state until the next instructions are given by the user.

(Detailed Operation of Session Managing Circuitry 17)

Next, a description is given in detail of an operation example of the session managing circuitry 17 referring to an example case in which the user gives instructions to perform the execution processing of the job macro JM2.

FIGS. 6A and 6B schematically illustrate an example of the session S managed by the session managing circuitry 17.

When the user logs in to the image forming apparatus 1 using the user name UN3 and the password PW3, the session managing circuitry 17 may issue the session S, and set the session number NS to the issued session S. Further, the session managing circuitry may set, to the session S, the access control information INF that is supplied from the user managing circuitry 15 and is associated with the user name UN3 and the password PW3, as illustrated in FIG. 6A. In the present example, the authority setting of the execution processing of the job macro JM2 is set to "permitted", and the authority settings of processing other than the authority setting of the execution processing of the job macro JM2 is set to "not permitted".

Thereafter, referring to FIG. 6B, when the user gives instructions to perform the execution processing of the job macro JM2, the session managing circuitry 17 may temporarily replace the authority setting, included in the access control information INF3 set to the session S, of each of the types of processing included in the job macro with the authority setting of the execution processing of the job macro JM2 as described referring to step S17. More specifically, the session managing circuitry 17 may first copy the access control information INF3 to generate original access control information INForg, and set the generated original access control information INForg to the session S. Further, the session managing circuitry 17 may replace the authority setting, included in the access control information INF3, of each of the two types of processing (the copy processing and the scan-to-email processing) included in the job macro JM2 illustrated in FIG. 4, with the authority setting of the execution processing of the job macro JM2. The session managing circuitry 17 may thus change each of the authority settings of the copy processing and the scan-to-email processing from "not permitted" to "permitted" in the present example. The session managing circuitry 17 may confirm the authority state using the access control information INF3 provided with the replaced authority settings while the job macro JM2 is executed.

Thereafter, the session managing circuitry 17 may confirm whether the user has the authority to perform the copy processing in response to the inquiry from the copy processor 21, and makes a reply, to the copy processor 21, with a result of the confirmation. Further, the session managing circuitry 17 may also confirm whether the user has the authority to perform the scan-to-email processing in response to the inquiry from the scan-to-email processor 24, and make a reply, to the scan-to-email processor 24 with a result of the confirmation. The session managing circuitry 17 may notify the copy processor 21 that the user has the authority to perform the copy processing, and notify the scan-to-email processor 24 that the user has the authority to perform the scan-to-email processing. Accordingly, the copy processor 21 may perform the copy processing using the parameters PM1 to PM3 provided for the copy processing included in the job macro JM2, and the scan-to-email processor 24 may perform the scan-to-email processing using the parameters PM1 and PM2 provided for the scan-to-email processing included in the job macro JM2.

When the execution processing of the job macro JM2 is thus finished, the session managing circuitry 17 may replace again, with the original authority setting, the authority setting that has been replaced at the beginning of the execution of the job macro JM2 as described referring to step S21. More specifically, the session managing circuitry 17 may delete the access control information INF3 illustrated in FIG. 6B and set the original access control information INForg to the session S as the access control information INF3. The session S may be thereby returned to a state before the execution processing of the job macro JM2 is performed as illustrated in FIG. 6A.

As described above, the image forming apparatus 1 has the configuration in which the access control information INF is used. This allows for authority setting of each processing for each user. It is therefore possible to improve security.

Moreover, the image forming apparatus 1 has the configuration that allows for registration of the job macro JM. This makes it possible to set the parameter value of the frequently-used parameter PM in advance. Therefore, it is not necessary for the user to set the parameter PM each time the user uses the image forming apparatus 1. Accordingly, it is therefore possible to improve user-friendliness.

Moreover, the image forming apparatus 1 has the configuration in which, when the execution processing of the job macro JM is to be performed, the authority setting, included in the access control information INF set to the session S, of each of the types of processing included in the job macro JM is temporarily replaced with the authority setting of the execution processing of the job macro JM. This allows the image forming apparatus 1 to have improved freedom in authority setting. More specifically, the image forming apparatus 1 may have, for example, a configuration that makes it possible not to give the user assigned with the user identifier ID3 (a so-called limited user) the authority to perform general processing such as the copy processing, the fax processing, the printing processing and the scan-to-email processing, but to give the foregoing user the authority to perform part of the forgoing general processing only upon execution of the job macro JM2. Accordingly, the user is not limited in use of all functions of the image forming apparatus 1, but is allowed to use the image forming apparatus 1 only upon executing the job macro JM2. As a result, the image forming apparatus 1 achieves both an improvement in user-friendliness and an improvement in security.

Moreover, the image forming apparatus 1 has the configuration that is able to set, when registering the job macro JM, whether the parameter value is changeable upon execution of the job macro JM. More specifically, for example, the e-mail address of the receiver provided for the scan-to-email processing is made unchangeable for the job macro JM2 illustrated in FIG. 4 including the copy processing and the scan-to-email processing. In this example case, the image forming apparatus 1 is allowed to give the user the authority to perform the copy processing under the condition that a result of the copy processing is to be sent to a predetermined e-mail address. As a result, the image forming apparatus 1 achieves both an improvement in user-friendliness and an improvement in security.

[Effects]

As described above, according to the present example embodiment, upon execution of the execution processing of the job macro, the authority setting, included in the access control information set to the session, of each of the types of processing included in the job macro is temporarily replaced with the authority setting of the execution processing of the job macro. As a result, it is possible to achieve both an improvement in user-friendliness and an improvement in security.

According to the present example embodiment, upon registration of the job macro, it is settable whether the parameter value is changeable upon execution of the job macro. As a result, it is possible to achieve both an improvement in user-friendliness and an improvement in security.

[Modification 1-1]

The foregoing example embodiment has the configuration in which the user inputs the user name UN and the password PW using the operation unit 12. However, this is not limitative. Alternatively, for example, an IC card may be used that stores the user name UN and the password PW. The user may pass the IC card over the image forming apparatus 1, thereby causing the image forming apparatus 1 to acquire the user name UN and the password PW.

[Modification 1-2]

The foregoing example embodiment has the configuration in which the executing circuitry 20 performs the copy processing, the fax processing, the printing processing, and the scan-to-email processing. However, this is not limitative. Alternatively, for example the image forming apparatus 1 may be provided with a universal serial bus (USB) interface. The image forming apparatus 1 may be thereby provided with a function of storing a result of scanning in a USB memory coupled to the USB interface. Further, the image forming apparatus 1 may be provided with a function of performing the printing processing on the basis of data stored in the USB memory. Further, the image forming apparatus 1 may be provided with a function of transmitting the result of scanning to as sheared folder on a server provided in a network.

The invention has been described above referring to some example embodiments and the modifications thereof. However, the invention is not limited to the foregoing example embodiments and the foregoing, modifications thereof, and is variously modifiable.

For example, the invention is applied to the so-called multi-function peripheral in the foregoing example embodiments and the foregoing modifications thereof. However, this is not limitative. Alternatively, the invention is applicable to various apparatuses that perform image processing such as a printer that performs the printing processing, a scanner that performs the scanning processing, and a facsimile that performs the fax processing.

Furthermore, the invention encompasses any possible combination of some or all of the various embodiments and the modifications described herein and incorporated herein.

It is possible to achieve at least the following configurations from the above-described example embodiments of the invention.

(1)

An image processing apparatus, it an executing circuitry that executes one or more types of image processing;

a macro executing circuitry that executes, with the executing circuitry, a first macro to which predetermined one or more types of image processing out of the one or more types of image processing are assigned, the predetermined one or more types of image processing including a first type of image processing; and a managing circuitry that manages execution authority setting of the first type of image processing and execution authority setting of the first macro, and temporarily changes the execution authority setting of the first type of image processing on a basis of the execution authority setting of the first macro upon the execution of the first macro by the macro executing circuitry.

(2)

The image processing apparatus according to (1), further including a macro registering circuitry that registers the first macro, wherein the first type of image processing is provided with a settable parameter, and the macro registering circuitry sets a parameter value of the parameter to a first parameter value, and is able to set whether the parameter value is changeable or unchangeable upon the execution of the first macro by the macro executing circuitry (3)

The image processing apparatus according to (2), wherein the executing circuitry executes the first type of image processing on a basis of an instruction given by the macro executing circuitry, upon the execution of the first macro by the macro executing circuitry.

(4)

The image processing apparatus according to (3), wherein the executing circuitry executes the first type of image processing with the first parameter value when the parameter value is unchangeable, upon executing the first type of image processing on the basis of the instruction given by the macro executing circuitry.

(5)

The image processing apparatus according to (3), further including an input unit that performs reception of an input of the parameter value when the parameter value is changeable, wherein, upon executing the first type of image processing on the basis of the instruction given the macro executing circuitry,
the executing circuitry executes the first type of image processing with the first parameter value in absence of the reception of the input of the parameter value by the input unit when the parameter value is changeable, and
the executing circuitry executes the first type of image processing with a second parameter value in response to presence of the reception of the second parameter value by the input unit when the parameter value is changeable.

(6)

The image processing apparatus according to any one of (2) to (5), wherein the predetermined one or more types of image processing include a second type of image processing, and the managing circuitry further manages execution authority setting of the second type of image processing, and temporarily changes the execution authority setting of the second type of image processing on a basis of the execution authority setting of the first macro upon the execution of the first macro by the macro executing circuitry.

(7)

The image processing apparatus according to any one of (2) to (6), wherein the managing circuitry further manages registration authority setting of a macro registration operation with the macro registering circuitry.

(8)

The image processing apparatus according to any one of (1) to (7), wherein the macro executing circuitry executes a second macro to which predetermined one or more types of image processing out of the one or more types of image processing are assigned, the predetermined one or more types of image processing assigned to the second macro including a third type of image processing, and the managing circuitry further manages execution authority setting of the third type of image processing and execution authority setting of the second macro, and temporarily changes the execution authority setting of the third type of image processing on a basis of the execution authority setting of the second macro upon the execution of the second macro by the macro executing circuitry.

(9)

The image processing apparatus according to any one of (1) to (8), wherein the executing circuitry is able to execute a plurality of types of image processing out of the one or more types of image processing, the plurality of types of image processing including the first type of image processing, the predetermined one or more types of the image processing includes predetermined number of types of image processing out of the plurality of types of image processing, and the managing circuitry manages execution authority setting of each of the plurality of types of image processing, and temporarily changes the execution authority setting of each of the predetermined number of types of image processing on a basis of the execution authority setting of the first macro upon the execution of the first macro by the macro executing circuitry.

(10)

An image processing apparatus, including:

an executing circuitry that executes one or more types of image processing;

a macro executing circuitry that executes, with the executing circuitry, a first macro to which predetermined one or more types of image processing out of the one or more types of image processing are assigned, the predetermined one or more types of image processing including a first type of image processing, and the first type of image processing being provided with a settable parameter; and a macro registering circuitry that registers the first macro and is able to set, upon registering the first macro, whether the parameter value of the parameter is changeable or unchangeable upon the execution of the first macro by the macro executing circuitry.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An image processing apparatus, comprising:
an operation unit that receives a user operation;
an authentication circuitry that performs a user authentication process on a basis of an instruction from the operation unit, and generates a first user identifier when the user authentication process is successful;
an executing circuitry that executes one or more types of image processing;
a job macro executing circuitry that executes, with the executing circuitry, a first job macro to which predetermined one or more types of image processing out of the one or more types of image processing are assigned, the predetermined one or more types of image processing including a first type of image processing; and
a managing circuitry issues a session on a basis of the instruction from the operation unit, sets, to the session, first access control information that is associated with the first user identifier and includes information on execution authority setting of the first type of image processing and information on execution authority setting of the first job macro, manages, on a basis of the first access control information, the execution authority setting of the first type of image processing and the execution authority setting of the first job macro, both being related to the first user identifier, temporarily changes, based on the first access control information, the execution authority setting of the first type of image processing on the basis of the execution authority setting of the first job macro upon the execution of the first job macro by the job macro executing circuitry, replaces, after the execution of the first job macro, the execution authority setting of the first type of image processing with the execution authority setting that is before being temporarily changed, and ends the session on the basis of the instruction from the operation unit received after replacing the execution authority setting of the first type of image processing,
wherein the managing circuitry is configured to temporarily cause the execution authority setting of the first type of image processing to be set to permitted, on a condition that, upon the execution of the first job macro, the execution authority setting of the first type of image processing is set to not permitted in the first access control information and the execution authority setting of the first job macro is set to permitted in the first access control information, and replace, after the execution of the first job macro, the execution authority setting of the first type of image processing with the execution authority setting that is set to not permitted,
wherein the first job macro is configured to manage execution of the predetermined one or more types of image processing, and
wherein the first type of image processing comprises one of copy processing, printing processing, fax processing or scan-to-email processing, and
wherein the first job macro does not include a user name related to a currently logged-in user or user identified information related to the currently logged-in user.

2. The image processing apparatus according to claim 1, further comprising a job macro registering circuitry that registers the first job macro, wherein
the first type of image processing is provided with a settable parameter, and
the job macro registering circuitry sets a parameter value of the settable parameter to a first parameter value, and is configured to set whether the parameter value is changeable or unchangeable upon the execution of the first job macro by the job macro executing circuitry.

3. The image processing apparatus according to claim 2, wherein the executing circuitry executes the first type of image processing on the basis of the instruction given by the job macro executing circuitry, upon the execution of the first job macro by the job macro executing circuitry.

4. The image processing apparatus according to claim 3, wherein the executing circuitry executes the first type of image processing with the first parameter value when the parameter value is unchangeable, upon executing the first type of image processing on the basis of the instruction given by the job macro executing circuitry.

5. The image processing apparatus according to claim 3, further comprising an input unit that performs reception of an input of the parameter value when the parameter value is changeable, wherein,
upon executing the first type of image processing on the basis of the instruction given by the job macro executing circuitry,
the executing circuitry executes the first type of image processing with the first parameter value in absence of the reception of the input of the parameter value by the input unit when the parameter value is changeable, and
the executing circuitry executes the first type of image processing with a second parameter value in response to presence of the reception of the second parameter value by the input unit when the parameter value is changeable.

6. The image processing apparatus according to claim 2, wherein the predetermined one or more types of image processing include a second type of image processing,
the first access control information further includes information on execution authority setting of the second type of image processing,
wherein the second type of image processing comprises the one of the copy processing, the printing processing, the fax processing or the scan-to-email processing, and
the managing circuitry further manages, based on the first access control information, the execution authority setting of the second type of image processing, and temporarily changes, based on the first access control information, the execution authority setting of the second type of image processing on the basis of the execution authority setting of the first job macro upon the execution of the first job macro by the job macro executing circuitry.

7. The image processing apparatus according to claim 2, wherein
the first access control information further includes information on registration authority setting of a job macro registration operation performed by the job macro registering circuitry, and
the managing circuitry further manages, based on the first access control information, the registration authority setting of the job macro registration operation.

8. The image processing apparatus according to claim 1, wherein the job macro executing circuitry executes a second job macro to which the predetermined one or more types of the image processing out of the one or more types of image processing are assigned, the predetermined one or more types of image processing assigned to the second job macro including a third type of image processing, the first access control information further includes information on execution authority setting of the third type of image processing and information on execution authority setting of the second job macro, the third type of image processing comprises the one of the copy processing, the printing processing, the fax processing or the scan-to-email processing, and the managing circuitry further manages, based the first access control information, the execution authority setting of the third type of image processing and the execution authority setting of the second job macro, and temporarily changes, based the first access control information, the execution authority setting of the third type of image processing on a basis of the execution authority setting of the second job macro upon the execution of the second job macro by the job macro executing circuitry.

9. The image processing apparatus according to claim 1, wherein the executing circuitry is configured to execute a plurality of types of image processing out of the one or more types of image processing, the plurality of types of image processing including the first type of image processing, the predetermined one or more types of the image processing includes predetermined number of types of image processing out of the plurality of types of image processing, the first access control information further includes information on execution authority setting of each of the plurality of types of image processing, and the managing circuitry manages, based on the first access control information, the execution authority setting of each of the plurality of types of image processing, and temporarily changes, based on the first access control information, the execution authority setting of each of the predetermined number of types of image processing on a basis of the execution authority setting of the first job macro upon the execution of the first job macro by the job macro executing circuitry.

\* \* \* \* \*